United States Patent
Natarajan et al.

(10) Patent No.: US 9,514,496 B2
(45) Date of Patent: Dec. 6, 2016

(54) SYSTEM FOR MANAGEMENT OF SENTIMENTS AND METHODS THEREOF

(71) Applicant: Infosys Limited, Bangalore (IN)

(72) Inventors: Swaminathan Natarajan, Bangalore (IN); Krishnamurthy Sai Deepak, Bangalore (IN); Prasanna Nagesh Teli, Kolhapur (IN); Venugopal Subbarao, Bangalore (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 319 days.

(21) Appl. No.: 14/199,831

(22) Filed: Mar. 6, 2014

(65) Prior Publication Data
US 2014/0289253 A1 Sep. 25, 2014

(30) Foreign Application Priority Data
Mar. 20, 2013 (IN) ............................ 1201/CHE/2013

(51) Int. Cl.
*G06F 17/30* (2006.01)
*G06Q 50/00* (2012.01)
*G06Q 10/10* (2012.01)
*G06Q 30/02* (2012.01)

(52) U.S. Cl.
CPC ............ *G06Q 50/01* (2013.01); *G06Q 10/101* (2013.01); *G06Q 10/103* (2013.01); *G06Q 30/0204* (2013.01); *G06Q 30/0278* (2013.01)

(58) Field of Classification Search
CPC .................... G06F 17/30598; G06F 17/30705
USPC .......................................................... 707/740
See application file for complete search history.

(56) References Cited

U.S. PATENT DOCUMENTS

| | | | |
|---|---|---|---|
| 8,682,649 B2* | 3/2014 | Bellegarda | G06F 17/2785 704/10 |
| 8,862,591 B2* | 10/2014 | Chowdhury | G06F 3/0482 707/748 |
| 9,092,421 B2* | 7/2015 | Chowdhury | G06F 3/0482 |
| 2008/0154883 A1* | 6/2008 | Chowdhury | G06F 3/0482 |
| 2010/0030648 A1 | 2/2010 | Manolescu et al. | |
| 2010/0050118 A1* | 2/2010 | Chowdhury | G06F 3/0482 715/810 |
| 2010/0174726 A1 | 7/2010 | Nance et al. | |
| 2010/0312769 A1* | 12/2010 | Bailey | G06F 17/30705 707/740 |
| 2011/0035381 A1 | 2/2011 | Thompson et al. | |
| 2011/0112825 A1* | 5/2011 | Bellegarda | G06F 17/2785 704/9 |
| 2012/0233258 A1* | 9/2012 | Vijayaraghavan | G06Q 30/02 709/204 |
| 2013/0173254 A1* | 7/2013 | Alemi | G06F 17/2775 704/9 |

(Continued)

*Primary Examiner* — Sheree Brown
(74) *Attorney, Agent, or Firm* — LeClairRyan, a Professional Corporation

(57) ABSTRACT

Systems and methods for improved management of sentiments over conventional approaches are disclosed. Supervised approach is used to augment the rule-based approach for classification. Initially, sentiment evaluation is performed by the system using a rule based approach and an interface is provided to the user to give feedback on the correctness of evaluated sentiment. This feedback is used by the sentiment evaluation system to update the set of rule-based and also apply the supervised approach to train the classifier for evaluating complex posts.

15 Claims, 4 Drawing Sheets

(56) References Cited

U.S. PATENT DOCUMENTS

| | | | |
|---|---|---|---|
| 2013/0311485 A1* | 11/2013 | Khan | G06F 17/2785 707/748 |
| 2014/0136185 A1* | 5/2014 | Bhatt | G06F 17/30707 704/9 |
| 2015/0331563 A1* | 11/2015 | Chowdhury | G06F 3/0482 715/765 |

* cited by examiner (PRIOR-ART)

SYSTEM FOR MANAGEMENT OF SENTIMENTS AND METHODS THEREOF

CROSS-REFERENCE TO RELATED APPLICATIONS

This application claims the benefit of Indian Patent Application Filing No. 1201/CHE/2013, filed Mar. 20, 2013, which is hereby incorporated by reference in its entirety.

FIELD OF THE INVENTION

The present disclosure relates generally to the field of classification of content, and, more particularly, to systems and methods for sentiment classification and management.

BACKGROUND OF THE INVENTION

A content classification system (hereinafter may be referred to as 'classification system'), in general, might be used to filter content from a large corpus to identify content in context of some information. The classification could also be used to flag the content in terms of belonging to a distinct class. For example, a content classification system could be used to capture sentiments from posts relating to one or more products or services, from various forums, including social platforms. The term, 'post', as used herein, means an amalgamation of sentences. The term, social platform, as used herein, means web-based services that allow members to construct a public or a semi-public profile within the boundary of that particular community. Classification of these posts could be used to evaluate a marketing strategy for a product or service. While a post is used as an example of content, it should be understood that any artifact with an amalgamation of sentences might be equally applicable.

A sentiment, in general, refers to a view or an opinion towards a situation or an event. Various methods have been proposed for evaluating sentiment from text. Conventionally, evaluation of sentiment from text within the posts has been performed using a rule based approach. Ruled-based approach applies a set of rules to pre-process text in order to aid classification by techniques such as, part-of-speech (hereinafter may be referred to as 'POS') tagging and keyword phrases to tag sentiment into distinct classes. Rule-based approach needs to be exhaustive and deriving sentiment from free form text using incomplete rules can result in erroneous evaluation. Evolving rule-base over time can be difficult as changing POS tagging rules may not be feasible for a corpus containing large number of posts. Further, predefined static rules might be infeasible to cover all classes of possible text examples while conceiving the system.

Another approach has been to use supervised learning methods where several features from a corpus of posts are derived to train supervised classifiers. Training might involve providing the system with a corpus and classifications for each post in the training corpus. The system then operates a training process wherein patterns are discovered in the training corpus between the classifications of various posts. Supervised approach can also be limiting for system evolution as it requires re-training the entire system when new evidence is provided.

While these systems are useful, it is difficult to use either of the two approaches when the number of posts is not sufficient to build an exhaustive set of rules or appropriately train a classifier. Further, sentiment evaluation might be subjective to a user and therefore the same post can convey different information to another user. Hence, there is a considerable need in the art for a more sophisticated system capable of managing sentiments based on multiple inputs into multidimensional categories.

Disclosed herein are improved systems and methods for sentiment management which is adaptive to a user.

The present invention is directed to overcoming these and other deficiencies in the art.

SUMMARY OF THE INVENTION

Aspects of the disclosure relate to systems and methods for managing sentiments by making it adaptive to a user.

It is therefore one object of the present disclosure to provide systems and methods to use multiple approaches to derive sentiments and receive indications from at least one user pertaining to at least one post from a corpus of posts.

It is another object of the present disclosure to perform a neighborhood operation for posts with user indications.

It is yet another object of the present disclosure to enable a local and global update of the system for posts with user indications, for same or similar posts.

The above as well as additional aspects and advantages of the disclosure will become apparent in the following detailed written description

BRIEF DESCRIPTION OF THE DRAWINGS

The aspects of the disclosure will be better understood with the accompanying drawings.

While systems and methods are described herein by way of example and embodiments, those skilled in the art recognize that systems and methods disclosed herein are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF THE INVENTION

Disclosed embodiments provide computer-implemented methods, systems, and computer-readable media for managing sentiments by making it adaptive to a user. A user refers to at least one user who is using the sentiment management system. The embodiments described herein are related to management of posts to derive sentiments. While the particular embodiments described herein may illustrate the disclosure in a particular domain, the broad principles behind these embodiments could be applied in other fields of endeavor. To facilitate a clear understanding of the present disclosure, illustrative examples are provided herein which describe certain aspects of the disclosure. However, it is to be appreciated that these illustrations are not meant to limit the scope of the disclosure, and are provided herein to illustrate certain concepts associated with the disclosure.

It is also to be understood that the present disclosure may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture.

Figure 1:
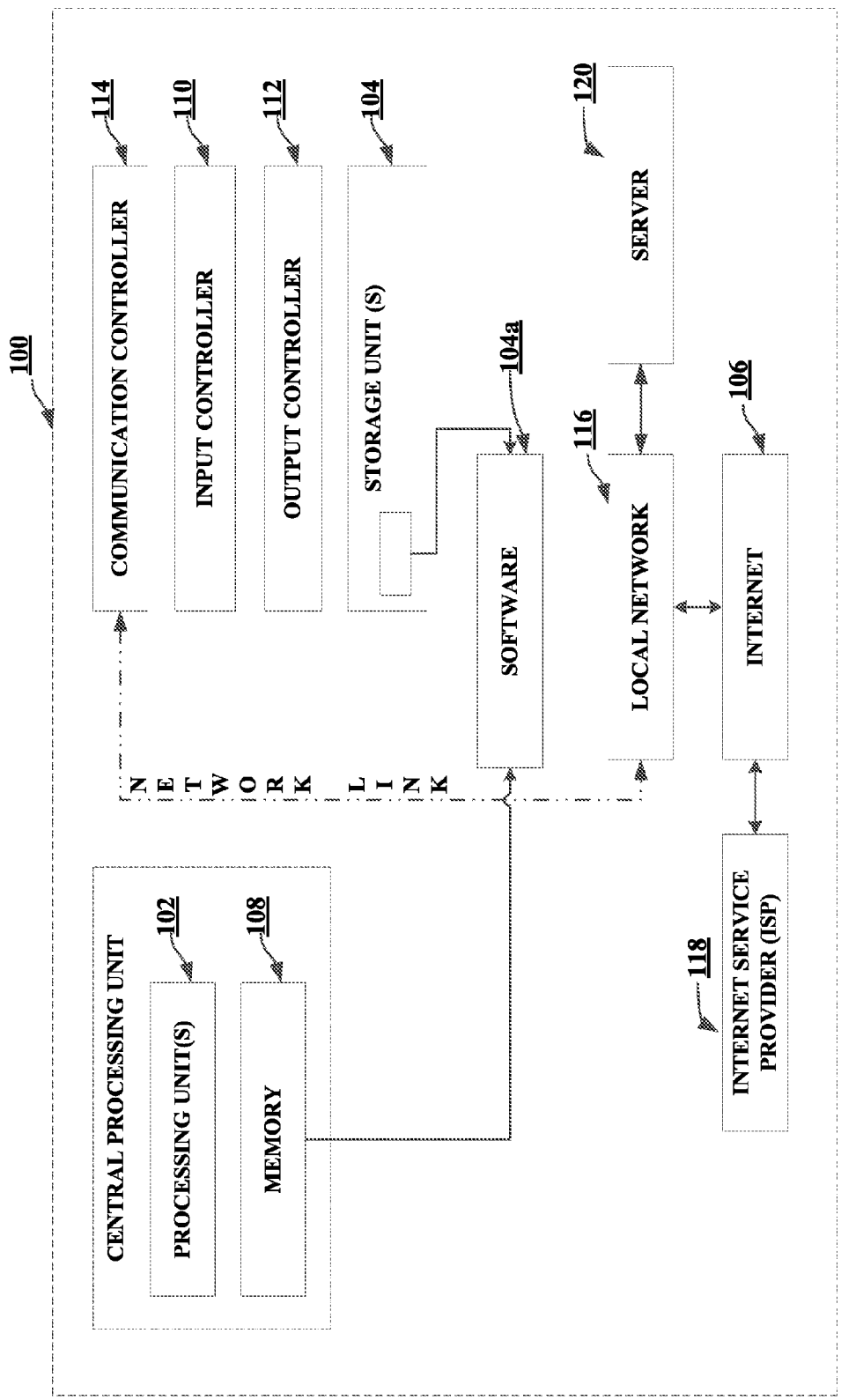
FIG. 1 (PRIOR ART) is a block diagram of a computing device to which the present disclosure may be applied.

FIG. 1 (PRIOR-ART) is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Usage of systems and methods described herein provide for improved management of sentiments over conventional approaches. Supervised approach is used to augment the rule based approach for classification. Initially, sentiment evaluation is performed by the system using a rule based approach and an interface is provided to the user to give feedback on the correctness of evaluated sentiment. This feedback is used by the sentiment evaluation system to update the set of rule base and also apply the supervised approach to train the classifier for evaluating complex posts. Posts can be classified into discrete classes for a given indication from a user. The term, 'post', as used herein, refers to an amalgamation of sentences. The terms, post and corpus of posts are interchangeably herein. Posts are input items for a classifier. For example, a post may include, but is not limited to, text, an image, a combination of images and text, or other organizations of content. The term 'classifier' refers to a system or code for mapping posts to discrete classes. The term 'classifier', as used herein, may be used interchangeably with 'sentiment evaluation system'. Classifier may use one or more approaches to classify sentiments evaluated from posts. For example, in a social platform, there might be a collection of posts relating to a product review with references to relating products.

In many cases, a corpus might be divided into classes one way for one indication and would be divided into those classes differently for an indication from a second user. The classifier, based on the type of approach employed, might classify a post as belonging to a negative class. There might be indications by several hundreds of users pertaining to the product review. From the indication of a first user, the post may be classified as belonging to a positive class and from the indication of a second user; the same post may be classified as belonging to a neutral class. Conventional approaches would only recognize the classification made by the classifier. However, in embodiments of the present disclosure as described herein, classifications made by the classifier are adapted to a user and further applied for future posts pertaining to same or similar contextual information.

Figure 2:
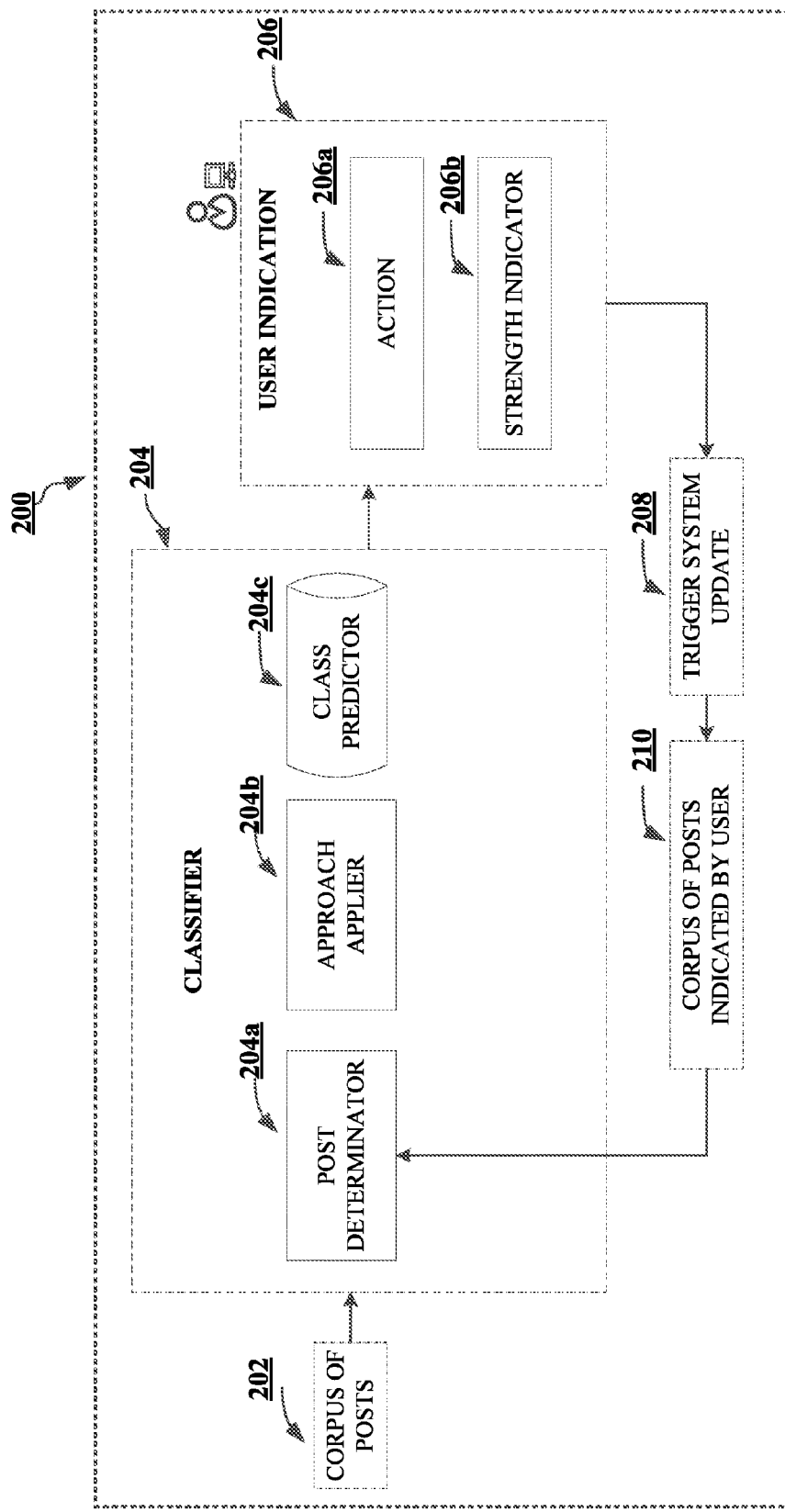
FIG. 2 is a high-level block diagram illustrating a system 200 in accordance with an embodiment of the present disclosure.

FIG. 2 is a high-level block diagram illustrating a system 200 in accordance with an embodiment of the present disclosure. When a post or a corpus of posts 202 is presented as an input item, system 200 operates a classifier 204 which processes posts to derive sentiments. Sentiment analysis can be performed for a product, product line and brand against time, region and population. For example, social platforms like blogs, Twitter, Facebook and the like provide useful channels to capture user sentiment early in comparison to traditional mediums like pre-launch consumer survey or the first set of sales figures. The posts on these social platforms may be analyzed for a given product or a product line and statistics on various sentiments may be generated for further analysis. According to an embodiment of the present disclosure, sentiments are derived by extracting linguistic components from each of the posts by generating features from input item to be considered for sentiment rating or evaluation. The term, feature, as used herein, refers to a unique attribute that could affect the derivation of sentiments from the post. Feature generation is primarily performed for efficiency reasons in order to increase the consistency of deriving sentiments. A post discriminator 204a generates from the input item, one or more features from post to be considered. Features might be domain specific, for example, in the case of English text classification; a relevant feature might be the presence of a unique word within a document, regardless of position. Based on the features and the linguistic extraction, a post determinator 204a determines the nature of a post within the corpus based on a complexity score for that post. According to an embodiment of the disclosure, a post may be determined as simple or complex. The term, 'simple post', as used herein, refers to smaller statements with few POS and a simple structure. The term, 'complex post', as used herein, refers to multiple sentences. For example, the post determinator 204a may be pre-configured to calculate a complexity score based on the linguistics, for example, but not limited to, the presence of pronouns, words and conjunctions in a post so as to classify a post from very simple to very complex.

TABLE I

LINGUISTIC EXTRACTION

| Pronouns (denoted as 'a') | Words (denoted as 'b') | Conjunctions | Score | Post Determination |
|---|---|---|---|---|
| <=a | <=b | NA | 0 | very simple |
| >a | <=b | NA | 1 | simple |
| NA | <b | >c | 2 | complex |
| NA | >=b | NA | 3 | very complex |

Once the post determination is completed, classifier operates an approach applier 204b employs at least one approach to a post so as to determine a first classification type for that post, using a class predictor 204c. The approach applier 204b can preferably be pre-configured to apply a rule-based approach for posts classified as very simple and simple posts. Complex posts may be applied with either rule-based approach or supervised approach or both approaches in a sequence. The implementation of either one or both approaches generates a discrete predicted class. The class predictor 204c classifies simple posts into discrete classes, for example, positive, negative or neutral sentiments. Complex posts may be classified as positive, negative, neutral and non-obvious. In other variations, the degree of the first classification type may be possible to yield more than four classes, for example, strongly positive and slightly positive. Posts with non-obvious sentiments can be routed through the approach applier 204b once again to employ the supervised approach for re-classifying using the class predictor 204c. Given the sentiment evaluated for posts by the class predictor 204c, a user 206 can either accept or reject the sentiment value. An action 206a by a user can trigger an update 208 in the sentiment evaluation system which modifies the system backend and also alters the way sentiment is evaluated for new posts in future. For example, a current post has been marked as belonging to a discrete class identified as a positive sentiment, then the reject action results in sentiment being modified to negative, and, vise-versa. A system update is triggered accordingly for future sentiment evaluation. Strength Indicator 206b captures the second classification type of the sentiment classes derived by the classifier 204. The impact of indication on the classifier 204 is determined by a second classification type 206b. While taking an action in relation to a post, a user can assign confidence values for the action 206a taken in relation to the discrete class identified for a post. According to an embodiment of this disclosure, confidence values could have variations which may include gradations indicating a discrete or predicted class as 'very satisfied', satisfied, 'dissatisfied' or 'very dissatisfied'. If the indication 'very satisfied" or 'very dissatisfied' then a larger number of posts is likely to be impacted whereas the effect of 'satisfied' or 'dissatisfied' is likely to have a marginal impact. For example, there may be posts about a product launch. A requirement may be to derive sentiments of social platform users' opinion for the launched product. Classifier 204 can take these posts and derive sentiments. The classifier 204 can work through the system to capture indications from other users. The systems and methods of the disclosure can be used to employ supervised approach for continued learning. After training, the data classification system can be used to predict classification of an unlabeled instance or a non-obvious instance.

Figure 3:
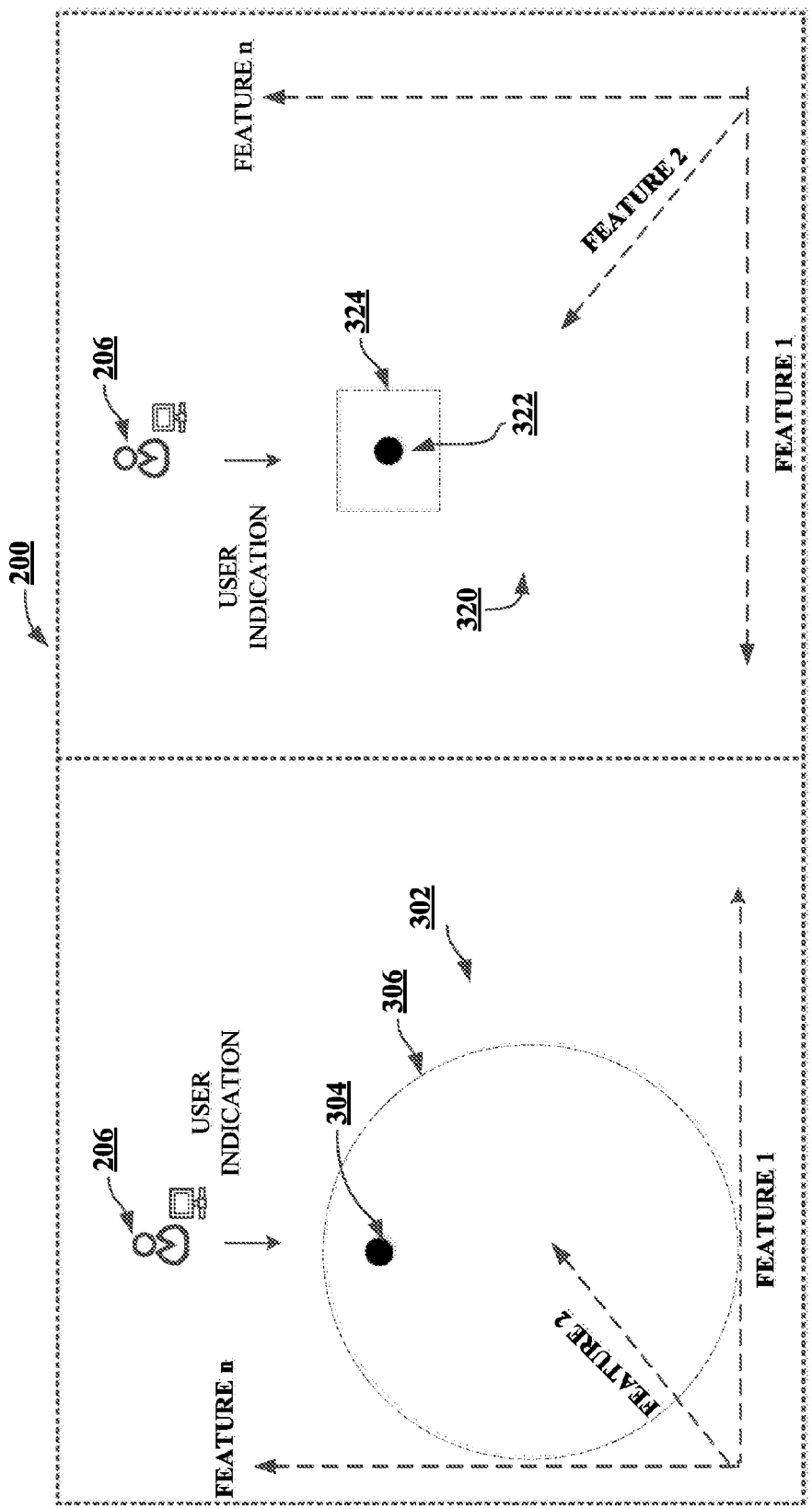
FIG. 3 is an illustration of a representative post from a corpus of posts 210 for which an update is triggered 208 in the system 200
Figure 4:
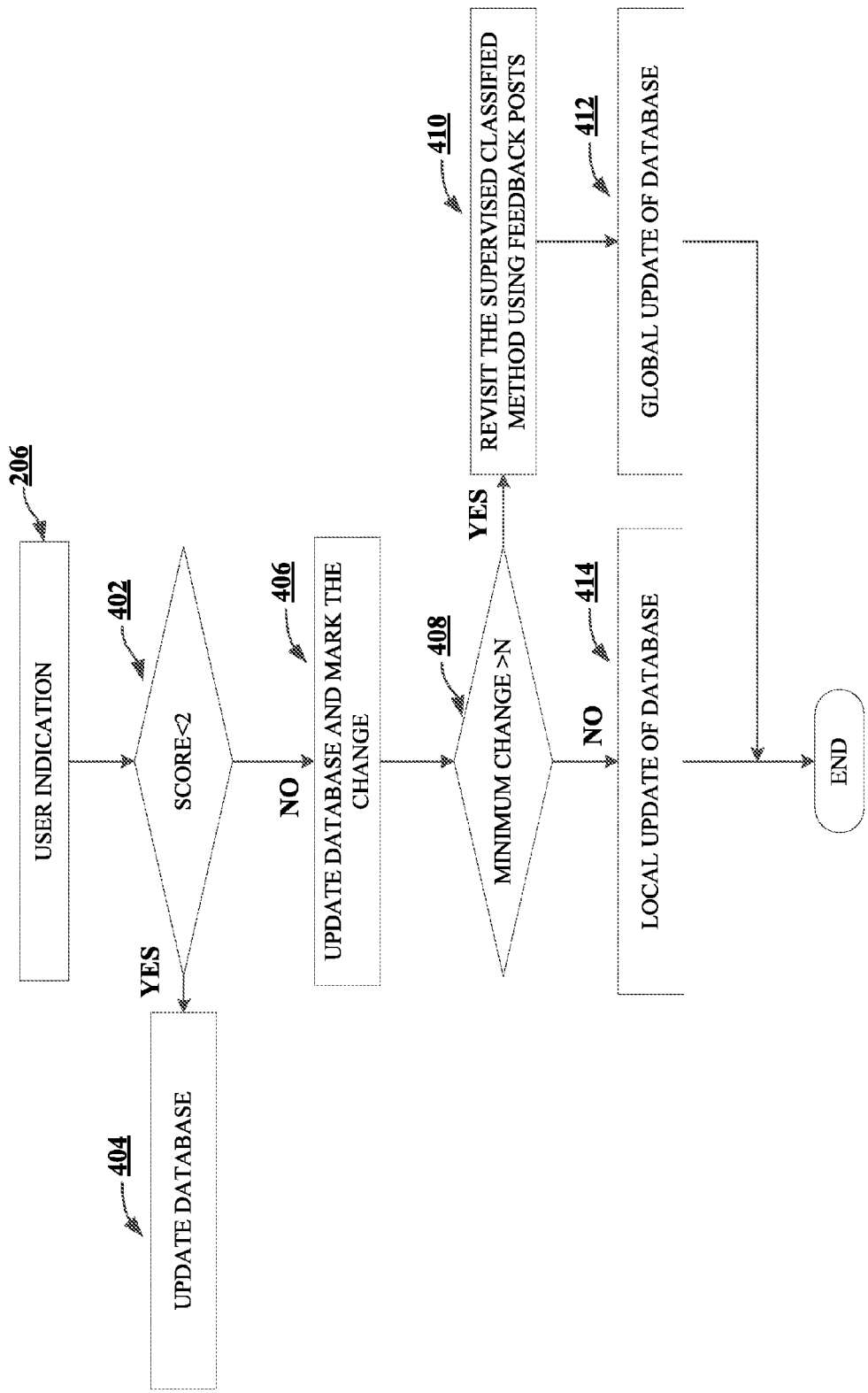
FIG. 4 illustrates a method to update the system based on user indications, in accordance with an embodiment of the present disclosure.

FIG. 3 is an illustration of a representative post from a corpus of posts 210 for which an update is triggered 208 in the system 200 in accordance with the method illustrated in FIG. 4. Based on the user indication 206 recorded by the system 200, an update is triggered in the system 208 for the corpus of posts 210 for which a user indication 206 has been received. Classifier 204 accepts a corpus of posts indicated by a user 210 comprising of at least one post. If the post determinator 206a determines the post as 'simple' or 'very simple' 402, an update is made to at least database to record the change 404. The sentiment of the post or the predicted class 206b is updated on the system. Preferably, no change occurs in the way sentiment class is predicted for future posts. A new rule can be added to the rule-based approach to evaluate posts corresponding to feature values of each of these posts. On the other hand, if the post determinator 206a determines the post as 'complex' or 'very complex', the update is made to at least database and the change is marked. 406. According to an embodiment of the disclosure, if sufficient number of indications (denoted by N) is received 408, the classifier 204 operates the approach applier 204b to employ supervised approach 410 to train the system for future classification of same or similar posts. The supervised classifier is trained or retrained for complex posts with a particular complexity score.

Every post in the corpus can be observed as a point in a multidimensional orthogonal numerical feature space. Each dimension corresponds to a feature used for training the classifier. Example include, but is not limited to, word frequency, POS frequency, co-occurrence frequency ordering, website impact metric, user impact metric, word length of post, word distance adjective mapping, pronoun mapping and resolving conjunction. A subset of these features (feature 1, feature 2 and feature n) is used to describe each post in the feature space for a given domain. After a post is distilled into a set of enumerated features, classifier 204 performs a neighborhood operation in the representative feature spaces 302 and 320. Position of a post 304, 322 (hereinafter may be referred to as a 'feature vector') along with user indication on sentiment is identified in the respective feature space 302 and 320. The term, neighborhood operation, as used herein, refers to range of same or similar posts which are updated for previously identified discrete class, in-line with the strength indication 206b. Generally, the more the classifier 204 is taught the more it is trained in order to improve the consistency. The neighborhood operation may be applied globally 306, 412 or locally 324, 414. A global neighborhood operation 306, 412 essentially extends the user indication all existing sentiment classifications derived from a previously same or similar post. No change in classifier is made for simple posts. For example, the discrete classes may extend to a post relating to a subject such as a company, competitor, or the like. A local neighborhood operation 324, 414 on the other hand makes changes to closely related posts only. The neighborhood operation can be performed by adjusting a preconfigured pattern space in n-dimensions around each of the one or more evaluated posts identified in the multidimensional feature space. Pre-configured pattern spaces include, for example, spheroid, ellipsoid, rectangular, or the like. The term pattern space, as used herein, is used to identify the local neighborhood of the post. The size of neighborhood may be controlled using these pre-configured pattern space with predefined values to determine the extent of feature space based on the strength indications 206b. The predefined pattern spaces are applied dynamically during system update 208 based on the subset of enumerated features, identifying a feature vector.

$$R = \frac{K_i}{2n} \sum_{i=1}^{n} |\max(f_n) - \min(f_n)|$$ (Equation 1 for Spheroid)

$$\begin{array}{l} A = A_1 = K_1|\max(f_1) - \min(f_1)| \\ B = A_2 = K_2|\max(f_2) - \min(f_2)| \\ \ldots \\ A_n = K_n|\max(f_n) - \min(f_n)| \end{array}$$

General equation of a centered ellipsoid – (Equation 2 for Ellipsoid)

$$\sum_{i=1}^{n} \frac{x_i^2}{A_i^2} = 1$$

$$\begin{array}{l} L1 = K_1|\max(f_1) - \min(f_1)| \\ L2 = K_2|\max(f_2) - \min(f_2)| \\ \ldots \\ Ln = K_n|\max(f_n) - \min(f_n)| \end{array}$$ (Equation 3 for Rectangle)

Where: K=Value of integer $K_i$ is pre-configured and $K_i$=[0-1]. K is large when strength indication has a large weight and vice-versa.

Using the formula of Equations 1, 2 and 3 for a spheroid pattern space, ellipsoid pattern space and a rectangular pattern space respectively, a neighborhood operation can be defined for the given post.

Various modifications and variations of the present disclosure will be apparent to those skilled in the art without departing from the scope and spirit of the disclosure. Although the disclosure has been described in connection with specific preferred embodiments, it should be understood that the disclosure as claimed should not be unduly limited to such specific embodiments. Indeed, various modifications of the described modes for carrying out the disclosure which are obvious to those skilled in the art are intended to be within the scope of the claims.

What is claimed is:

1. A method for optimizing sentiment classification, the method comprising:
    performing, by a sentiment management computing device, a classification analysis on a first post received for sentiment evaluation to determine a first sentiment classification;
    receiving, by the sentiment management computing device, a second sentiment classification related to the first post from at least one user; and
    updating, by the sentiment management computing device, the classification analysis when the first sentiment classification does not match the second sentiment classification, wherein the updating the sentiment classification analysis comprises:
        plotting the first post in a multidimensional feature space, wherein each dimension in the multidimensional feature space represents a unique feature corresponding to the first post;
        performing a neighborhood operation for the first post to identify a pattern space in the multidimensional feature space containing a plurality of posts associated with the first post; and
        applying the second sentiment classification to the plurality of posts in the pattern space, wherein the plurality of posts in the pattern space provide updated training data for the classification analysis.

2. A sentiment management computing device, comprising:
    a processor coupled to a memory and configured to execute programmed instructions stored in the memory, comprising:
    performing a classification analysis on a first post received for sentiment evaluation to determine a first sentiment classification;
    receiving a second sentiment classification related to the first post from at least one user; and
    updating the classification analysis when the first sentiment classification does not match the second sentiment classification, wherein the updating the sentiment classification analysis comprises:
        plotting the first post in a multidimensional feature space, wherein each dimension in the multidimensional feature space represents a unique feature corresponding to the first post;
        performing a neighborhood operation for the first post to identify a pattern space in the multidimensional feature space containing a plurality of posts associated with the first post; and
        applying the second sentiment classification to the plurality of posts in the pattern space, wherein the plurality of posts in the pattern space provide updated training data for the classification analysis.

3. A non-transitory computer readable medium having stored thereon instructions for optimizing sentiment evaluation comprising machine executable code which when executed by a processor, causes the processor to perform steps comprising:
    performing a classification analysis on a first post received for sentiment evaluation to determine a first sentiment classification;
    receiving a second sentiment classification related to the first post from at least one user; and
    updating the classification analysis when the first sentiment classification does not match the second sentiment classification, wherein the updating the sentiment classification analysis comprises:
        plotting the first post in a multidimensional feature space, wherein each dimension in the multidimensional feature space represents a unique feature corresponding to the first post;
        performing a neighborhood operation for the first post to identify a pattern space in the multidimensional feature space containing a plurality of posts associated with the first post; and
        applying the second sentiment classification to the plurality of posts in the pattern space, wherein the plurality of posts in the pattern space provide updated training data for the classification analysis.

4. The method as set forth in claim 1, wherein performing the classification analysis further comprises:
   determining, by the sentiment management computing device, a complexity level of the first post; and
   performing, by the sentiment management computing device, the classification analysis based on the complexity level.

5. The method as set forth in claim 4 wherein the performing the classification analysis based on the complexity level further comprises performing, by the sentiment management computing device, a rules based classification analysis when the complexity level is below a threshold complexity level.

6. The method as set forth in claim 4 wherein the performing the classification analysis based on the complexity level further comprises performing, by the sentiment management computing device, a supervised classification analysis when the complexity level is above a threshold complexity level.

7. The method as set forth in claim 1 further comprising:
   receiving, by the sentiment management computing device, a strength indication of the second sentiment classification from the user;
   performing, by the sentiment management computing device, the neighborhood operation based on the strength indication.

8. The device as set forth in claim 2, wherein performing the classification analysis further comprises:
   determining a complexity level of the first post; and
   performing the classification analysis based on the complexity level.

9. The device as set forth in claim 8 wherein the performing the classification analysis based on the complexity level further comprises performing a rules based classification analysis when the complexity level is below a threshold complexity level.

10. The device as set forth in claim 8 wherein the performing the classification analysis based on the complexity level further comprises performing a supervised classification analysis when the complexity level is above a threshold complexity level.

11. The device as set forth in claim 2 further comprising:
    receiving a strength indication of the second sentiment classification from the user;
    performing the neighborhood operation based on the strength indication.

12. The medium as set forth in claim 3, wherein performing the classification analysis further comprises:
    determining a complexity level of the first post; and
    performing the classification analysis based on the complexity level.

13. The medium as set forth in claim 12 wherein the performing the classification analysis based on the complexity level further comprises performing a rules based classification analysis when the complexity level is below a threshold complexity level.

14. The medium as set forth in claim 12 wherein the performing the classification analysis based on the complexity level further comprises performing a supervised classification analysis when the complexity level is above a threshold complexity level.

15. The medium as set forth in claim 3 further comprising:
    receiving a strength indication of the second sentiment classification from the user;
    performing the neighborhood operation based on the strength indication.

* * * * *